US000001925H

United States Statutory Invention Registration [19]

[11] Reg. Number: H1,925

Stellman et al.

[45] Published: Dec. 5, 2000

[54] APPARATUS AND METHOD FOR MONITORING STEEL DECARBURIZATION BY REMOTE FLAME EMISSION SPATIAL IMAGING SPECTROSCOPY

[75] Inventors: Christopher M. Stellman, Waldorf; Frank Bucholtz, Crofton, both of Md.

[73] Assignee: The United States of America as represented by the Secretary of the Navy, Washington, D.C.

[21] Appl. No.: 09/135,053

[22] Filed: Aug. 18, 1998

[51] Int. Cl.[7] ..... G01J 3/28

[52] U.S. Cl. ..... 356/326

[58] Field of Search ..... 356/300, 315, 356/326, 328, 334

[56] References Cited

U.S. PATENT DOCUMENTS

| | | | |
|---|---|---|---|
| 2,803,987 | 8/1957 | Galey . | |
| 4,060,326 | 11/1977 | Tirabassi et al. . | |
| 4,820,046 | 4/1989 | Sohma et al. | 356/328 |
| 5,125,963 | 6/1992 | Alden et al. | 75/375 |
| 5,305,082 | 4/1994 | Bret | 356/328 |
| 5,717,487 | 2/1998 | Davies | 356/328 |

*Primary Examiner*—Daniel T. Pihulic

*Attorney, Agent, or Firm*—Barry A. Edelberg; Ralph T. Webb

[57] ABSTRACT

An apparatus and method for monitoring a stainless steel decarburization process includes a flame emission spatial imaging spectrometer and a telescopic lens system coupled to the spectrometer. The telescopic lens system is positioned to direct light from the furnace flame into the spectrometer. The flame emission imaging spectrometer and the telescopic lens system are located at a remote distance away from the harsh environment of the furnace flame.

17 Claims, 5 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

APPARATUS AND METHOD FOR MONITORING STEEL DECARBURIZATION BY REMOTE FLAME EMISSION SPATIAL IMAGING SPECTROSCOPY

BACKGROUND OF THE INVENTION

1. Field of the Invention

The invention relates to an apparatus and method for monitoring a steel decarburization process. In particular, the invention relates to an apparatus and method for monitoring spatial and spectral changes of a steel decarburization furnace flame by flame emission imaging spectroscopy carried out from a location remote from the furnace flame.

2. Description of the Related Art

During the manufacturing of high-quality stainless steel, carbon impurities are removed by "blowing" molten steel in a furnace such as an argon oxygen decarburization (AOD) furnace. The decarburization process must be closely monitored to determine the endpoint of the process. If the decarburization process is ended too soon, carbon impurities remain in the steel. If the decarburization process is carried out for too long, expensive metal additives (e.g. Cr, Ni, Mo, etc.) are lost.

Typically, decarburization processes are monitored by thermal characterization and complex mathematical modeling. When a decarburization process is thought to be complete, a sample of the steel batch is removed from the furnace and tested in a laboratory to determine if an acceptable level of unwanted carbon has been removed and if an acceptable level of specialty metals has been retained. Steel batches are often tested for composition and purity several times during the course of a blow. This method of monitoring chemical composition is disadvantageous in several ways. First, it relies on an indirect measurement of the steel's chemical composition, using theoretical mathematical models and physical temperature measurements to extrapolate a measure of carbon content. Second, it relies on disposable thermocouples for the collection of temperature data. Because this is cost, time and labor intensive, it limits batch testing to periodic intervals (often with unacceptable frequency). In short, the current method of monitoring decarburization has proven insufficient. Prediction of the batch carbon content has been limited, thus multiple sampling and laboratory testing has become common practice. As expected, this can lead to economic losses through unnecessary testing or, more seriously, through the destruction of a steel batch (or at least its very expensive metal additives).

Various less typical methods of monitoring metallurgical processes are described, for example, in the following U.S. patents incorporated herein by reference: U.S. Pat. No. 2,803,987 to Galey, U.S. Pat. No. 3,181,343 to Fillon, U.S. Pat. No. 3,329,495 to Ohta et al, U.S. Pat. No. 3,594,155 to Ramachandran, U.S. Pat. No. 3,720,404 to Carlson et al, U.S. Pat. No. 3,741,557 to Harbaugh et al, U.S. Pat. No. 4,251,270 to Hoshi et al, U.S. Pat. No. 4,416,691 to Narita et al, U.S. Pat. No. 5,603,746 to Sharan and U.S. Pat. No. 5,522,915 to Ono et al.

Visual observation of flames has also been used in metallurgy to determine the endpoint of a process. This method has the disadvantage of being highly prone to human error.

U.S. Pat. No. 5,125,963 to Alden et al describes the use of optical spectroscopy in the visible region of the spectrum to monitor metallurgical processes and mentions that optical spectroscopy can be used to measure the intensities of carbon compounds during iron and steel production.

Because of the dynamic behavior of a furnace flame, optical spectroscopy using non-imaging optics and a one-dimensional detection scheme to measure spectral emission at a single point in the flame is inadequate to accurately monitor decarburization. Spectra collected at a single point in the flame are likely to show dramatic changes in baseline (background) intensity as a function of the flame's ever-changing spatial characteristics. Baseline fluctuations may be eliminated by taking an integrated measure of the spectral emission over the entire flame. However, doing so also reduces or eliminates the signal of the comparatively smaller emission bands of interest.

SUMMARY OF THE INVENTION

It is therefore an object of this invention to provide an apparatus and method for monitoring a stainless steel making process in a decarburization furnace.

It is a further object of this invention to provide an apparatus and method for determining the endpoint of a stainless steel making process in a decarburization furnace.

It is a further object of this invention to provide an apparatus and method for spatially and spectrally monitoring the furnace flame of a decarburization furnace used in a stainless steel making process.

It is a further object of this invention to provide an apparatus and method for spectrally monitoring a furnace flame over a horizontal cross-section of the flame.

It is a further object of this invention to provide an apparatus and method for spatially and spectrally monitoring a stainless steel making process in a decarburization furnace whereby baseline fluctuations in the spectra can be eliminated while retaining acceptable signal levels for emission bands of interest.

It is a further object of this invention to provide an apparatus and method for monitoring a stainless steel making process in a decarburization furnace that does not require retrofitting the existing machinery of the furnace.

It is a further object of this invention to provide an apparatus and method for monitoring a stainless steel making process wherein the monitoring takes place from an operator-safe distance away from the furnace flame.

These and other objects are accomplished by an apparatus that includes a flame emission spatial imaging spectrometer and a telescopic lens system coupled to the spectrometer, wherein the telescopic lens system is positioned to direct light from numerous spatially discrete regions of the furnace flame into the spectrometer. The flame emission spatial imaging spectrometer and the telescopic lens system are located at a remote distance away from the harsh environment of the furnace flame. The apparatus of the present invention is preferably used to monitor the flame emissions across a horizontal slice of the furnace flame.

DETAILED DESCRIPTION OF THE PREFERRED EMBODIMENT

Figure 1:
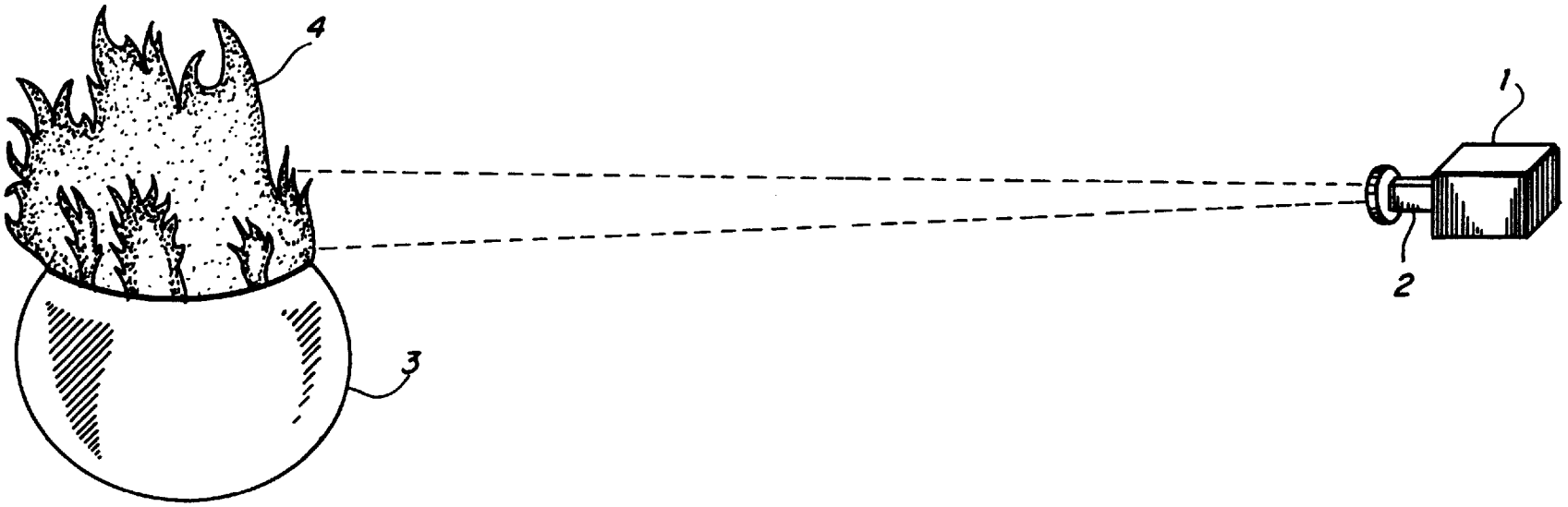
FIG. 1 is a diagrammatic representation of the invention.

As shown diagrammatically in FIG. 1, the apparatus of the present invention comprises a spatial imaging spectrometer 1 coupled to a telescopic lens system 2. The apparatus is positioned with respect to a decarburization furnace 3 so that there is a clear line of sight between the apparatus and the furnace flame or plume 3. The flame emission from the furnace plume is focused by the telescopic lens system onto the front entrance slit of the spectrometer and the collected signal is dispersed with a standard holographic grating. The resulting spectrum is focused onto a silica-based CCD detector and the emission spectrum is downloaded through a transmission line 5 to an intelligent processor 6 to calculate the steel carbon content. Finally, a statement on whether to proceed with subsequent laboratory testing is provided to the user.

The spectrometer may be any conventional spatial imaging spectrometer capable of recording flame emission spectra in the visible range, particularly in the range of 300 nm to 900 nm. Suitable commercial instruments are made by, for example, Instruments S.A., Edison, N.J. and Chromex, Albuquerque, N.M. An imaging spectrograph is described in, for example, U.S. Pat. No. 5,305,082, incorporated herein by reference. The spectrometer should employ a high-frame-rate 2-dimensional CCD detector to spatially monitor the flame emission of the flame. The emission from the furnace flame is focused by the telescopic lens system onto the entrance slit of the spectrograph and a wavelength dispersed image of a horizontal slice of the flame is collected by way of the CCD. Ultimately, this provides the user a rapid means of characterizing the flame as a function of horizontal space (distance across the flame) and changing spectral emission. The spatially imaged spectral emissions data generated by the spectrometer may be transmitted to a computer, which can be readily programmed by persons skilled in the art to calculate the steel carbon content. For example, the computer could read in a single spectral image from the detector and then search across the image's series of emission spectra to find a spectrum of a predetermined baseline profile. Searching across the image and selecting a baseline-specific spectrum allows for fluctuations in baseline intensity to be eliminated while retaining acceptable signal levels for the emission bands of interest. The individual spectrum could then be assigned a carbon content level by searching through a previously stored library and spectrally matching the individual spectrum to a stored spectrum of known carbon content. With modem spectrographic equipment including high-frame-rate CCD detection, coupled with a computer system, it should be possible to achieve a constant analysis of steel carbon data in near real-time.

The telescopic lens system can be made from conventional optical components and should be of sufficient power so that light from the furnace flame can be directed into the spectrometer while the spectrometer and the telescopic lens system are positioned at a remote distance from the flame and so that the field of view includes only light from the furnace flame. Preferably, the field of view includes a substantial portion of the width of the furnace flame. The spectrometer and the telescopic lens system should be positioned at an operator-safe distance from the furnace flame, that is, at a sufficient distance away from the flame so that a human operator can approach the instruments safely and make any necessary adjustments during the course of a blow. Preferably, the spectrometer and the telescopic lens system are positioned at least 25 feet away from the furnace flame and may be as far away as 1000 feet. An additional requirement is that the telescopic lens system be positioned so that there is a clear optical path between the furnace flame and the telescopic lens.

Having described the invention, the following examples are given to illustrate specific applications of the invention, including the best mode now known to perform the invention. These specific examples are not intended to limit the scope of the invention described in this application.

EXAMPLES

Example 1: Analysis of carbon compounds in a flame (mock example)

The following example, while not involving a furnace flame in a steelmaking process and not using the telescopic lens system of the present invention, illustrates how a varying carbon content in a flame may be detected by flame emission spectroscopy in the visible range.

To support the idea of developing a flame emission imaging spectrometer for remote monitoring of an AOD furnace, the change in molecular emission of a mock furnace flame was investigated. To simulate an AOD furnace flame, a common propane torch was mounted in front of a visible spectrometer and adapted to allow for changes in the oxygen, carbon dioxide and propane fuel supply. By varying the concentration of these molecular species, the propane combustion equilibrium can be altered and subsequent emission changes can be observed. The spectrometer was outfitted with a fiber-optic probe that employed a small collimating lens at the distal fiber face to ensure efficient collection of the flame's emitted light. The collected light was dispersed with a low resolution grating and the corresponding spectrum was collected with a silicon-based CCD array. All spectra were collected with an integration time of 1 second and no signal averaging was required.

Figure 2:
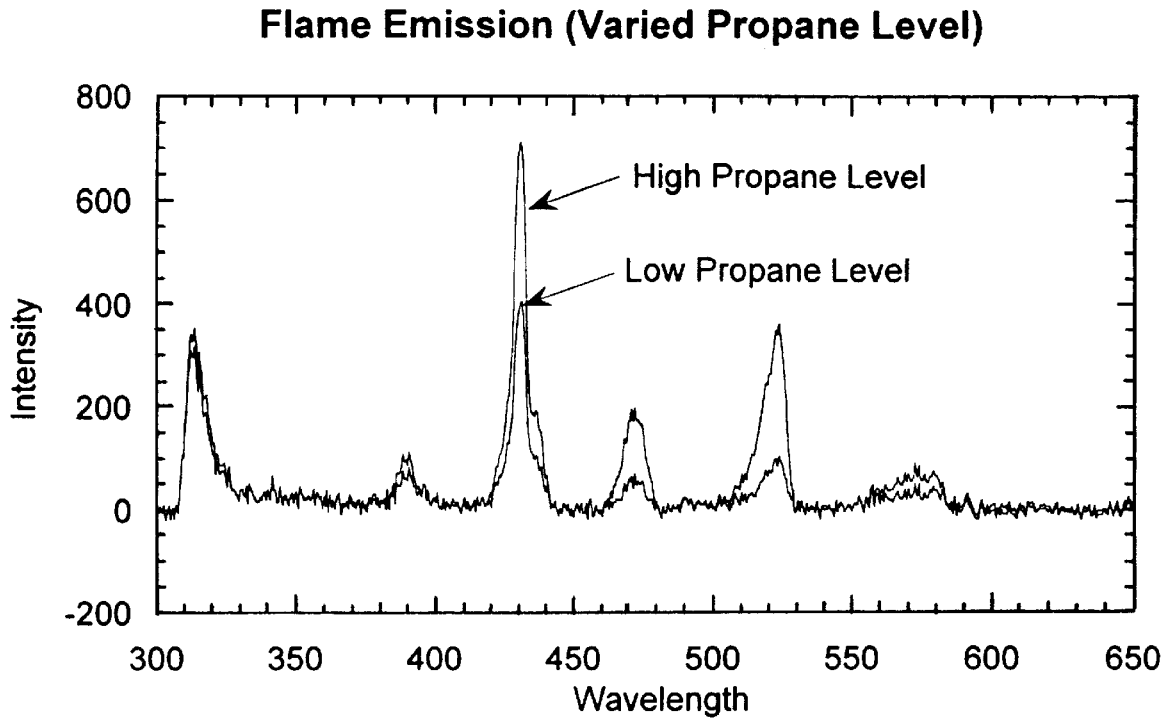
FIG. 2 shows the superimposed spectra in the range of 300 nm to 650 nm of a mock furnace flame with high and low levels of propane.
Figure 3:
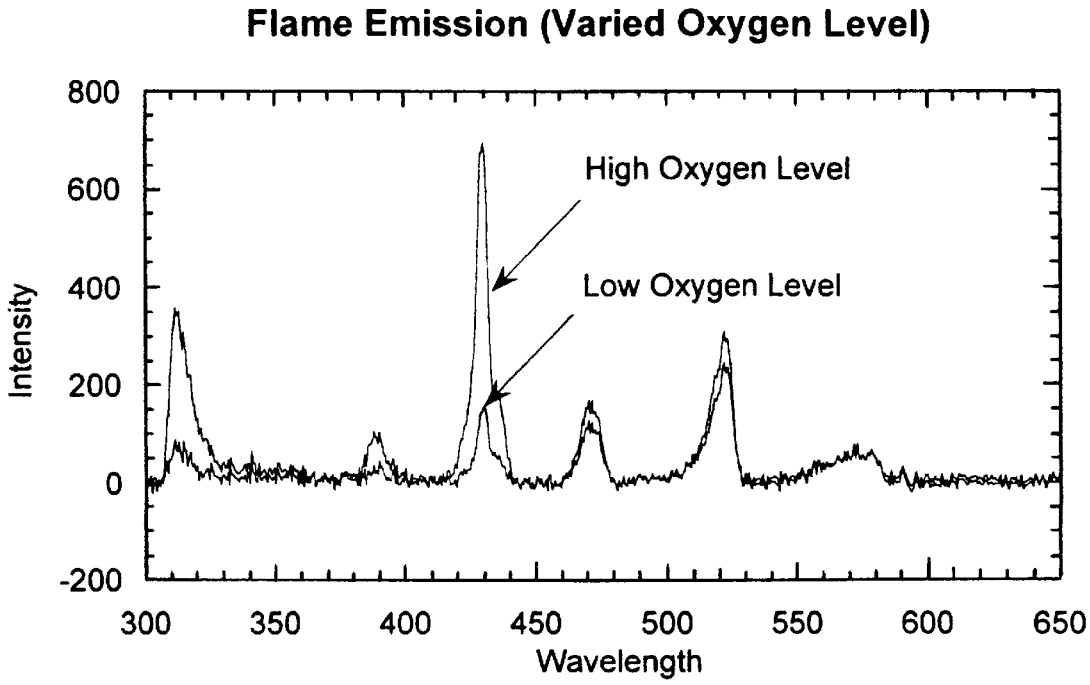
FIG. 3 shows the superimposed spectra in the range of 300 nm to 650 nm of a mock furnace flame with high and low levels of oxygen.
Figure 4:
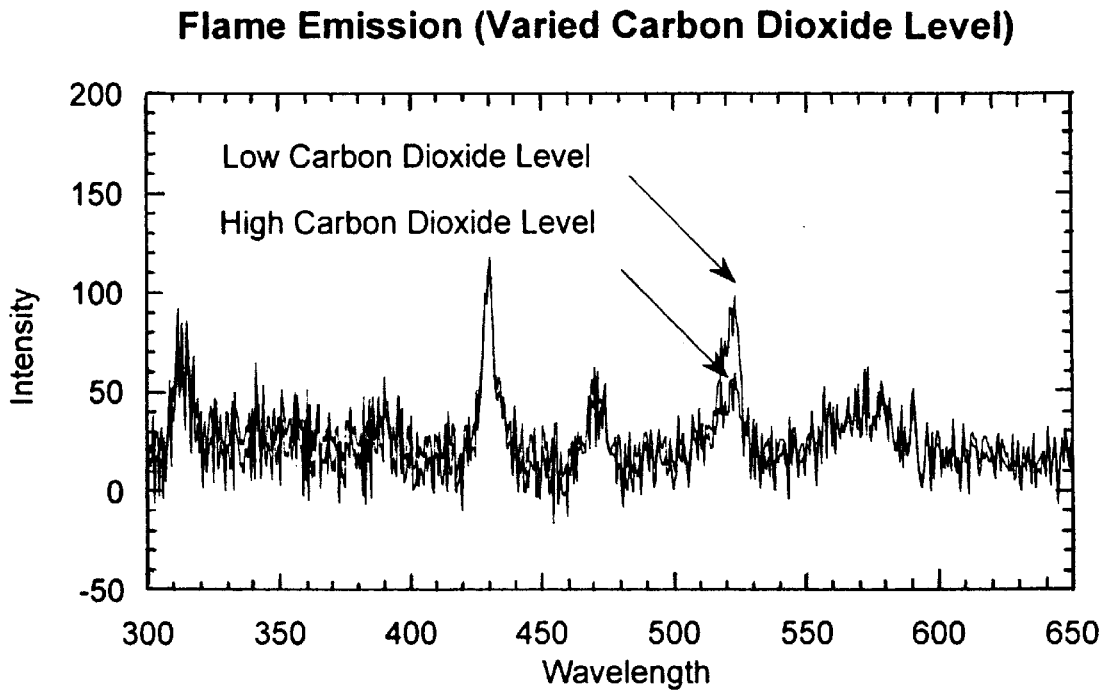
FIG. 4 shows the superimposed spectra in the range of 300 nm to 650 nm of a mock furnace flame with high and low levels of carbon dioxide.

FIGS. 2–4 demonstrate that significant changes occur in the flame's molecular emission as a function of changing oxygen, carbon dioxide and propane fuel supply. The bands at 314, 390 and 432 nm are from CH hydrocarbon radicals and the bands at 474, 516 and 563 nm (the Swan bands) are from diatomic carbon, $C_2$. FIG. 2 shows that by increasing the level of propane supplied to the flame the intensity of the bands at 432, 474 and 516 nm increase in intensity. In short, the emission spectrum undergoes an overall green shift. In contrast, FIG. 3 shows that by increasing the level of oxygen supplied to the flame the emission spectrum undergoes a blue shift, with the bands at 314, 390 and 432 nm increasing in intensity. Finally, it is shown in FIG. 4 that a subtle decrease in the band at 516 nm occurs when the level of carbon dioxide supplied to the flame is increased. From these plots, it is clearly evident that changes in the flame emission spectrum can be correlated to changes in flame composition. More specifically, it is demonstrated that as the concentration of carbon is varied, distinct spectral changes occur (e.g. relative green or blue shifting). It is on this basis that an instrument can be developed to monitor the changing chemistry (carbon content) of steel in an AOD furnace, with, of course, the primary difference being that the furnace flame is fueled by molten steel instead of propane gas.

Example 2: Field Test

A combination of an imaging spectrometer and a telescopic lens system was used to examine the flame emission of a real world argon oxygen decarburization (AOD) furnace in the field environment. The hyperspectral imaging sensor consisted of a standard 1" CCTV lens (Navitar, DO-5018), an f/2 imaging spectrograph (Instruments S.A., CP140), a high-frame-rate CCD camera (Sarnoff, VCCD512) with various support electronics and an industrial computer.

Imagery collected via the 70 mm lens was dispersed using a high throughput f/2 imaging spectrograph. The spectrograph employed an aberration-corrected concave holographic grating providing a flat field spectral range from 400 to 900 nm. For all collected data, a 50 $\mu$m slit width was used, providing a maximum spectral resolution of 3.5 nm.

Digital collection of the hyperspectral imagery was achieved using a custom high-frame-rate CCD camera. The camera was a 16-port split frame transfer CCD with 12-bit digitizers and operated at a maximum frame rate of 200 Hz. The 512×512 silicon focal plane array was capable of capturing digital hyperspectral data cubes with a maximum of 128 cross-track spatial pixels and 64 wavelength bands. A custom high-frame-rate interface box was used to merge the 16 12-bit digital camera output channels into a single 32-bit channel that was then read via a digital frame grabber board (MuTech, MV-1100).

The sensor was controlled using a 266 MHz Pentium II PC and a software application run under the Microsoft Windows NT operating system. The user interface provided a method of entering required input parameters, such as archival file names, correction coefficient files and camera frame rates.

The field experiment was performed at the Allegheny Ludlam steel manufacturing plant in Brackenridge, Pa. The field furnace is a 200 ton AOD furnace that is under continuous use, 24 hours a day, 365 days a year. This furnace is the predominant method of producing low carbon stainless grade steel at this manufacturing facility and world wide. In appearance, the furnace vessel resembles a small basic oxygen furnace (BOF) except that the backwall of the furnace has several tuyeres through which controlled amounts of oxygen and argon are injected into the steel melt. In short, gases introduced to the steel melt via these tuyeres are used to oxidize (blow) the carbon out of the steel in a controlled manner.

The sensor was placed on the roof of the AOD furnace control room and was approximately 50 feet from the furnace mouth (flame source). This location provided a direct line of sight between the sensor optics and the flame of interest while simultaneously matching the cross-track width of the flame to the field of view of the camera. The camera was oriented so that the slit was aligned parallel to the top of the furnace mouth. Data was collected over the course of several blows. A typical blow lasted 40–45 minutes and a set of emission data was collected every 2–5 minutes. Each data set consisted of a series of dark frames and sample frames collected at a frame rate of 200 Hz. Each frame of data provided 256 cross-flame emission spectra corresponding to 256 spatial positions across the furnace flame.

Gas concentrations provided during the blow were high in oxygen and low in argon, with the latter serving only as a coolant. An oxygen/argon ratio of 3/1 was typical in the early stages of the blow, with gas flow rates of 20,000 and 6,500 ft.$^3$/hr., respectively. The bath temperature ranged between 2700 and 3200° F. over the course of a blow. A detailed log of gas flow rates, bath temperature and weights of alloys added, all as a function of time, was recorded. Also real time video of the furnace blows were recorded for future examination and correlation with collected data.

Figure 5:
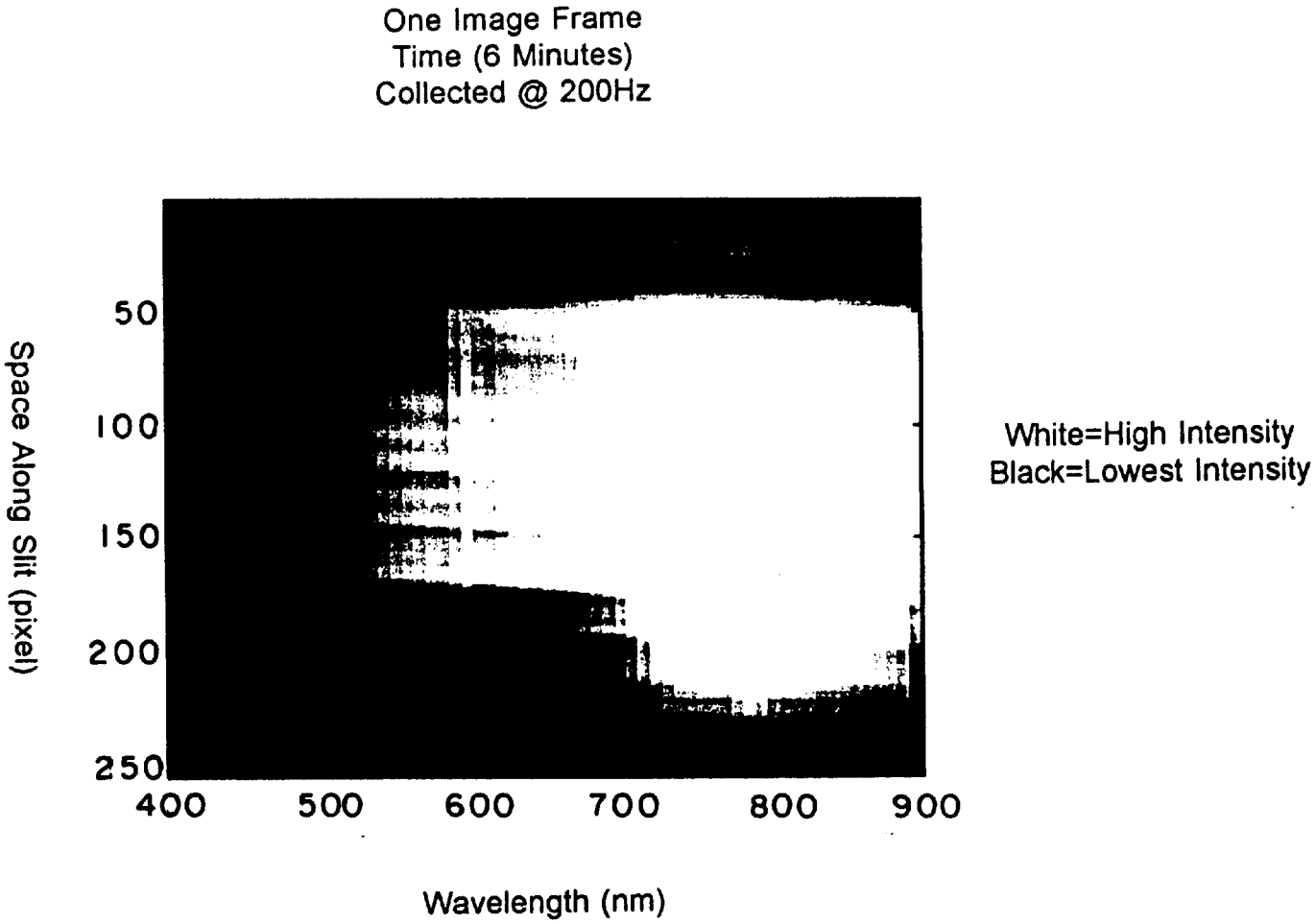
FIG. 5 shows a single spectral image frame of an AOD furnace flame at 6 minutes into a blow. The frame corresponds to spectra in the range of 400 nm to 900 nm for 256 spatial positions across the base of the flame.
Figure 6:
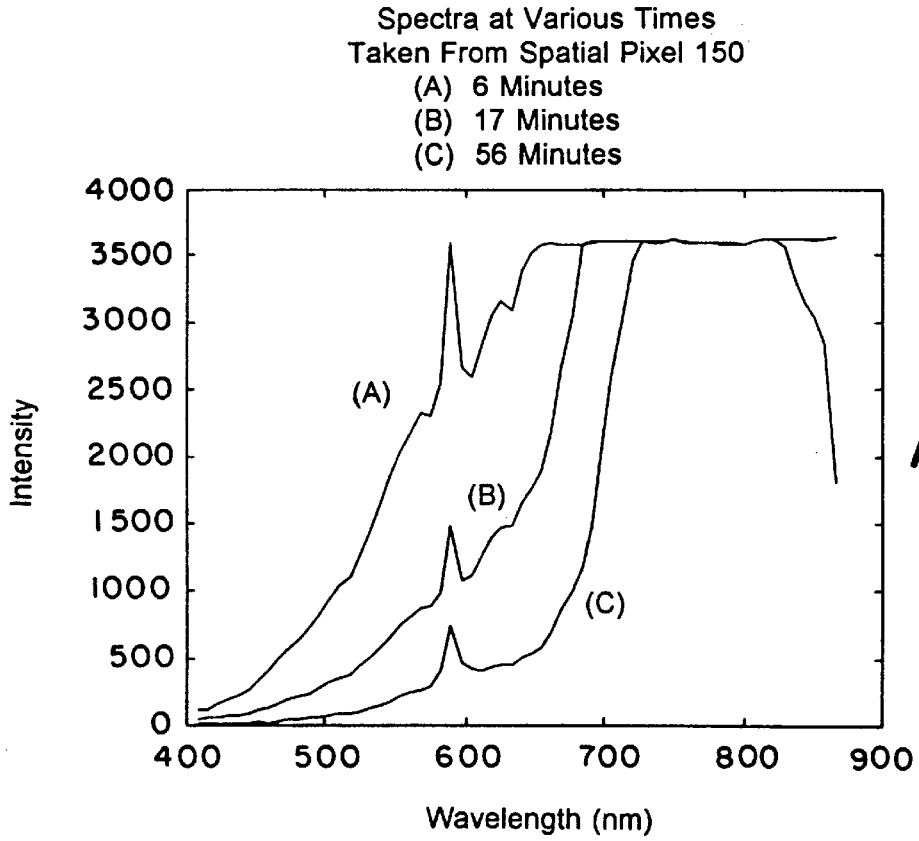
FIG. 6 shows the superimposed spectra in the range of 400 nm to 900 nm of an AOD furnace flame at 6, 17 and 56 minutes into a blow. The spectra all correspond to spatial pixel 150 of their respective image frames.
Figure 7:
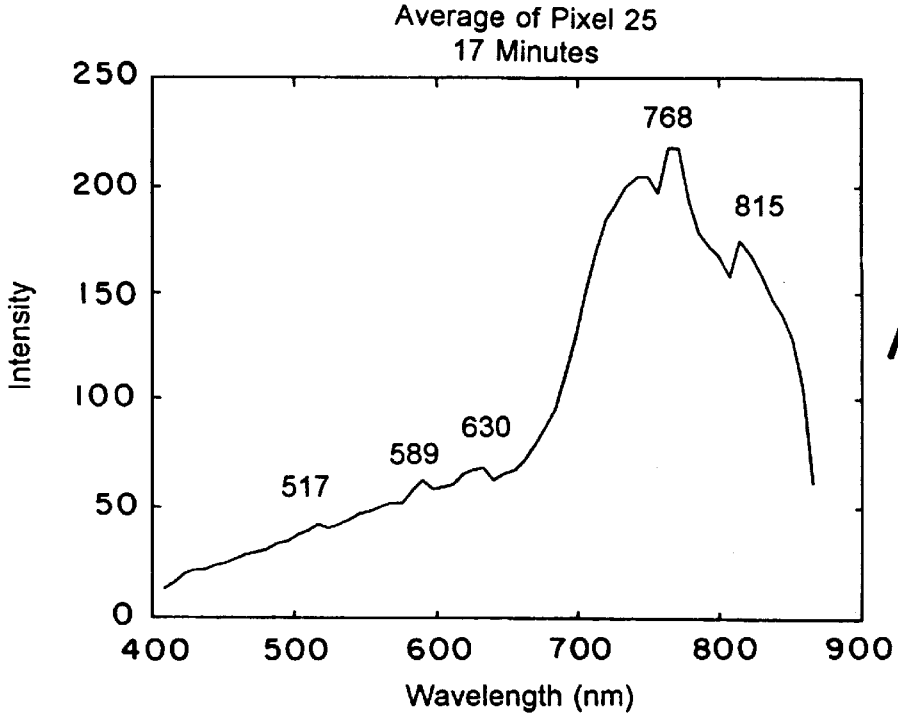
FIG. 7 shows the average of 100 spectra in the range of 400 nm to 900 nm of an AOD furnace flame at 6 minutes into a blow. The averaged spectra correspond to spatial pixel 25 of the respective image frames.

Several data sets were collected for a series of steel blows. It was demonstrated that data could be collected remotely and in the hostile, real world field environment of a steel manufacturing facility. FIGS. 5 and 6 demonstrate that the field instrument is capable of collecting spectral emission data as a function of both spatial position and time over the course of the decarburization process. FIG. 5, which is a single spectral image frame taken at 6 minutes into a blow, shows that there are significant variations in the flame's molecular emission as a function of distance across the flame. This emphasizes the need for using a spatial imaging approach to clearly monitor the changing molecular emission of the furnace flame and successfully relate these variations to changes in steel compositions. This also demonstrates that such a measurement is possible in near-real-time FIG. 6, which is the superimposed spectra in the range of 400 to 900 nm at 6, 17 and 56 minutes into a blow (all corresponding to spatial pixel 150), shows that there are significant variations in the flame's molecular emission as a function of time during the course of a blow. FIG. 7, which is the average of 100 spectra in the range of 400 nm to 900 nm at 6 minutes into a blow (all corresponding to spatial pixel 25), shows that emission bands are present at 517, 589, 630, 768 and 815 nm. Preliminary analysis of the data has shown that the emission spectra change significantly as a function of fuel supply and composition. It is apparent from these results that the spectral imaging data generated from the described system could be readily analyzed by a computer, programmed by persons skilled in the art, to calculate steel carbon content.

Obviously, many modifications and variations of the present invention are possible in light of the above teachings. It is therefore to be understood that, within the scope of the appended claims, the invention may be practiced otherwise than as specifically described.

What is claimed is:

1. An apparatus for spectroscopic monitoring of a decarburization furnace having a furnace flame, the apparatus comprising a flame emission spatial imaging spectrometer and a telescopic lens system coupled to the spectrometer, wherein the telescopic lens system is positioned to direct light from the furnace flame into the spectrometer, and wherein the flame emission spatial imaging spectrometer and the telescopic lens system are located at an operator-safe distance away from the furnace flame.

2. The apparatus of claim 1 wherein the apparatus is oriented with respect to the furnace flame so as to direct light from spatially discrete regions of the furnace flame into the spectrometer.

3. The apparatus of claim 1 wherein the apparatus is oriented with respect to the furnace flame so that light that is directed from the furnace flame into the spectrometer represents a horizontal slice of the furnace flame.

4. The apparatus of claim 1 wherein the flame emission spatial imaging spectrometer and the telescopic lens system are located at least about twenty-five feet from the furnace flame.

5. The apparatus of claim 2 further including means for generating spectral emissions data from the spatially discrete regions of the furnace flame, means for electronically transmitting the spectral emission data, and computer means electronically coupled to the flame emission spectrometer for receiving transmitted spectral emission data, for storing predetermined spectral emission data and for comparing transmitted spectral emission data with predetermined spectral emission data.

6. The apparatus of claim 1 wherein the decarburization furnace is a basic oxygen decarburization furnace.

7. The apparatus of claim 1 wherein the decarburization furnace is an argon oxygen decarburization furnace.

8. A method of monitoring a stainless steel making process in a decarburization furnace having a furnace flame, the method comprising the steps of (1) providing a flame emission spatial imaging spectrometer and a telescopic lens system coupled to the spectrometer, wherein the telescopic lens system is positioned to direct light from the furnace flame into the spectrometer and wherein the flame emission spectrometer and the telescopic lens system are located at an operator-safe distance away from the furnace flame, (2) monitoring the spatial intensity and spatial spectral distribution of light emission from the furnace flame during the stainless steel making process for spectral peaks corresponding to carbon compounds.

9. The method of claim 8 wherein the flame emission spatial imaging spectrometer and the telescopic lens system are oriented with respect to the furnace flame so as to direct light from spatially discrete regions of the furnace flame into the spectrometer.

10. The method of claim 8 wherein the flame emission spatial imaging spectrometer and the telescopic lens system are oriented with respect to the furnace flame so that light that is directed from the furnace flame into the spectrometer represents a horizontal slice of the furnace flame.

11. The method of claim 8 wherein the flame emission spatial imaging spectrometer and the telescopic lens system are located at least about twenty-five feet from the furnace flame.

12. The method of claim 8 wherein the decarburization furnace is a basic oxygen decarburization furnace.

13. The method of claim 8 wherein the decarburization furnace is an argon oxygen decarburization furnace.

14. A method of monitoring a stainless steel making process in a decarburization furnace having a furnace flame, the method comprising the steps of (1) providing an apparatus including a flame emission spatial imaging spectrometer and a telescopic lens system coupled to the spectrometer, wherein the telescopic lens system is positioned to direct light from the furnace flame into the spectrometer and wherein the flame emission spatial imaging spectrometer and the telescopic lens system are located at an operator-safe distance away from the furnace flame and wherein the apparatus is oriented with respect to the furnace flame so as to direct light from spatially discrete regions of the furnace flame into the spectrometer, means for generating spectral emission data from the spatially discrete regions of the furnace flame, means for electronically transmitting spectral emission data, and computer means electronically coupled to the flame emission spatial imaging spectrometer for receiving transmitted spectral emission data, for storing predetermined spectral emission data and for comparing transmitted spectral emission data with predetermined spectral emission data, and (2) monitoring the intensity and spectral distribution of light emission from the spatially discrete regions of the furnace flame during the stainless steel making process to generate spectral emission data, transmitting the spectral emission data to the computer means whereby the transmitted spectral emission data is compared with predetermined spectral emissions data.

15. The method of claim 14 wherein the flame emission spatial imaging spectrometer and the telescopic lens system are located at least about twenty-five feet from the furnace flame.

16. The method of claim 14 wherein the decarburization furnace is a basic oxygen decarburization furnace.

17. The method of claim 14 wherein the decarburization furnace is an argon oxygen decarburization furnace.

* * * * *